United States Patent
Hayashi et al.

(10) Patent No.: US 6,884,483 B2
(45) Date of Patent: *Apr. 26, 2005

(54) MULTILAYER BLOW MOLDED CONTAINER

(75) Inventors: Nahoto Hayashi, Pasadena, TX (US); William Scott Lambert, Pasadena, TX (US); Hiroshi Kawai, Kurashiki (JP); Kaoru Ikeda, Kurashiki (JP); Shinji Tai, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 55 days.

This patent is subject to a terminal disclaimer.

(21) Appl. No.: 10/310,950

(22) Filed: Dec. 6, 2002

(65) Prior Publication Data

US 2003/0207061 A1 Nov. 6, 2003

(30) Foreign Application Priority Data

Apr. 30, 2002 (JP) ..................................... 2002-128231

(51) Int. Cl.$^7$ .................... B32B 1/02; B32B 27/08; C08F 8/00; C08L 35/00; C08L 23/26

(52) U.S. Cl. .................... 428/36.7; 428/35.7; 428/36.6; 428/515; 428/517; 428/519; 428/520; 525/191; 525/207; 525/214; 525/217; 525/221; 525/222; 525/232; 525/238; 525/239; 525/240

(58) Field of Search ............................. 428/35.7, 36.6, 428/36.7, 515, 517, 519, 520; 525/191, 207, 214, 217, 221, 222, 232, 238, 239, 240

(56) References Cited

U.S. PATENT DOCUMENTS

| | | | | |
|---|---|---|---|---|
| 4,525,134 A | * | 6/1985 | McHenry et al. | 425/130 |
| 4,568,261 A | * | 2/1986 | McHenry et al. | 425/145 |
| 4,960,639 A | * | 10/1990 | Oda et al. | 428/34.5 |
| 5,221,566 A | * | 6/1993 | Tokoh et al. | 428/34.5 |
| 5,529,834 A | * | 6/1996 | Tsai et al. | 428/215 |
| 5,571,871 A | * | 11/1996 | Ikeda et al. | 525/337 |
| 6,033,749 A | * | 3/2000 | Hata et al. | 428/36.7 |
| 6,242,087 B1 | * | 6/2001 | Kawai | 428/336 |
| 6,398,059 B1 | * | 6/2002 | Hayashi et al. | 220/562 |
| 6,503,588 B1 | | 1/2003 | Hayashi et al. | 428/36.7 |
| 6,667,083 B1 | * | 12/2003 | Hayashi et al. | 428/35.7 |
| 2004/0076780 A1 | * | 4/2004 | Chan et al. | 428/35.7 |

FOREIGN PATENT DOCUMENTS

| | | | | |
|---|---|---|---|---|
| EP | 186154 A2 | * | 7/1986 | B65D/1/28 |
| JP | 55139228 A | * | 10/1980 | B29D/23/03 |

OTHER PUBLICATIONS

U.S. Appl. No. 09/680,966, filed Oct. 6, 2000, Tai et al.
U.S. Appl. No. 09/851,083, filed May 9, 2001, Hayashi et al.
U.S. Appl. No. 09/909,831, filed Jul. 23, 2001, Tai, et al.
U.S. Appl. No. 09/909,832, filed Jul. 23, 2001, Tai et al.
U.S. Appl. No. 10/796,072, filed Mar. 10, 2004, Michihata et al.
U.S. Appl. No. 10/796,012, filed Mar. 10, 2004, Michihata et al.

* cited by examiner

Primary Examiner—Harold Pyon
Assistant Examiner—Chris Bruenjes
(74) Attorney, Agent, or Firm—Oblon, Spivak, McClelland, Maier & Neustadt, P.C.

(57) ABSTRACT

Multilayer blow molded containers, which comprise a layer of an ethylene-vinyl alcohol copolymer (A) having an ethylene content of 5 to 60% by mol and a degree of saponification of 85% or more and a layer of a resin composition (B), characterized in that the resin composition (B) comprises 1 to 40% by weight of a thermoplastic resin (b1) having at least one functional group selected from the group consisting of boron-containing groups that are convertible to a boronic acid group in the presence of water and a boronic acid group (hereinafter, referred to as a boron-containing functional group), and 60 to 99% by weight of polypropylene (b2), exhibit excellent gas-barrier properties, have good interlayer adhesion, have excellent thermal stability, and are low in production cost.

17 Claims, No Drawings

MULTILAYER BLOW MOLDED CONTAINER

CROSS REFERENCES TO RELATED APPLICATIONS

This application claims priority to Japanese Patent Application No. 2002-128231, filed on Apr. 30, 2002, and which is incorporated herein by reference in its entirety.

BACKGROUND OF THE INVENTION

1. Field of the Invention

The present invention relates to multilayer blow molded containers having excellent gas-barrier properties, good interlayer adhesion, and excellent thermal stability. The present invention also relates to methods for preparing such multilayer blow molded containers.

2. Discussion of the Background

Since ethylene-vinyl alcohol copolymers (hereinafter, referred to as EVOH) are excellent in transparency, barrier properties against oxygen, carbon dioxide and nitrogen and oil resistance, and also excellent in melt-molding properties, they are used as wrapping materials for foods, medicaments and the like while making the best use of these properties. In recent years, in order to make up for gas-barrier properties at higher humidity, impact resistance and the like, EVOH are frequently used while being laminated with other thermoplastic resins excellent in moisture-proof properties and impact resistance. Also, in the field of hollow containers, a structure or constitution that contains a resin such as polyethylene, polypropylene, polyethylene terephthalate (PET), etc. in inner and outer layers and EVOH in an intermediate layer is favored.

Containers of thermoplastic polyesters, typically PET, are used in many fields, since they are excellent in various properties including transparency, mechanical properties, flavor-barrier properties and the like, low in possibility of elution of residual monomers and harmful additives upon molding, and excellent in hygienic quality and safety. On the other hand, since polypropylene is inactive to blood, has a low thermal shrinkage, and is low in price, polypropylene containers are attracting attention for use with medicaments and foods when the contents are filled while hot, or so-called hot-filled.

Concerning the polypropylene containers, Japanese Patent Laid Open No. 139228/1980 discloses a technique for improving adhesion strength between a polypropylene layer and an EVOH layer by adding an adhesive resin made of a maleic anhydride-modified polypropylene or the like to the polypropylene layer. It has been known that, in this case, an alkali metal such as sodium, etc. contained in the EVOH is effective for obtaining sufficient adhesion strength because it exhibits a catalytic effect.

SUMMARY OF THE INVENTION

Accordingly, it is one object of the invention is to provide a multilayer blow molded container that has excellent gas-barrier properties, has good interlayer adhesion, has excellent thermal stability, and is low in production cost.

The inventors have discovered that above object can be attained by a multilayer blow molded container comprising a layer of an ethylene-vinyl alcohol copolymer (A) having an ethylene content of 5 to 60% by mol and a degree of saponification of 85% or more and a layer of a resin composition (B), characterized in that the resin composition (B) comprises 1 to 40% by weight of a thermoplastic resin (b1) having at least one functional group selected from the group consisting of boron-containing groups that are convertible to a boronic acid group in the presence of water and a boronic acid group (hereinafter, referred to as a boron-containing functional group), and 60 to 99% by weight of polypropylene (b2).

The invention also encompasses a process for producing a multilayer injection blow molded container, characterized by multilayer injection blow molding an ethylene-vinyl alcohol copolymer (A) having an ethylene content of 5 to 60% by mol and a degree of saponification of 85% or more and a resin composition (B) comprising 1 to 40% by weight of a thermoplastic resin (b1) having a boron-containing functional group and 60 to 99% by weight of polypropylene (b2), and subsequently stretch blow molding them.

Furthermore, the invention also encompasses a process for producing a multilayer direct blow molded container, characterized by multilayer direct blow molding an ethylene-vinyl alcohol copolymer (A) having an ethylene content of 5 to 60% by mol and a degree of saponification of 85% or more and a resin composition (B) comprising 1 to 40% by weight of a thermoplastic resin (b1) having a boron-containing functional group and 60 to 99% by weight of polypropylene (b2).

DETAILED DESCRIPTION OF THE PREFERRED EMBODIMENTS

The invention will be described in detail below.

It is necessary that the ethylene content in EVOH (A) used in the invention is 5 to 60% by mol. The ethylene content is suitably 15% by mol or more, and more suitably 25% by mol or more. In addition, the ethylene content is suitably 55% by mol or less, and more suitably 50% by mol or less. When the ethylene content is less than 5% by mol, the melt-molding properties are inferior. On the other hand, when it exceeds 60% by mol, the gas-barrier properties are insufficient.

It is necessary that the degree of saponification of EVOH (A) is 85% or more, suitably 90% or more, and most suitably 99% or more. When the degree of saponification is less than 85%, the, gas-barrier properties and the thermal stability are insufficient.

EVOH (A) can be produced, for example, by a known process in which ethylene and a vinyl ester are copolymerized, followed by saponification. The vinyl ester includes vinyl acetate as a typical one, and vinyl esters of other aliphatic acids such as vinyl propionate, vinyl pivalate, etc. can also be used. In this case, a vinylsilane compound may be used as a component for copolymerization. Examples of the vinylsilane compound include vinyltrimethoxysilane, vinyltriethoxysilane, vinyltri(β-methoxyethoxy)silane, γ-methacryloxypropylmethoxysilane, etc. Among them, vinyltrimethoxysilane and vinyltriethoxysilane are preferably used. The content of the vinyl silane compound is preferably within a range of 0.0002 to 0.2% by mol. In addition, other polymerizable monomers, for example, α-olefins such as propylene, 1-butene, etc.; unsaturated carboxylic acids or esters thereof such as (meth)acrylic acid, methyl (meth)acrylate, ethyl (meth)acrylate, etc.; vinylpyrrolidone compounds such as N-vinylpyrrolidone, etc.; can also be used as a component for copolymerization, so far as it does not adversely affect the object of the invention.

The alkali metal salt content in EVOH (A) is preferably 100 ppm or less, more preferably 70 ppm or less, and most preferably 50 ppm or less, converted to an alkali metal element. Japanese Patent Laid-Open No. 139228/1980 discloses a technique for improving adhesion strength between a polypropylene layer and an EVOH layer by adding an adhesive resin made of maleic anhydride-modified polypropylene or the like to the polypropylene layer. It is described that, in this case, an alkali metal such as sodium, etc. contained in EVOH exhibits a catalytic effect, and therefore, the addition of an alkali metal salt is effective for obtaining sufficient adhesion strength. In the present invention, it has been discovered that the sufficient adhesion strength between the polypropylene layer and the EVOH layer is maintained by using a thermoplastic resin (b1) having a boron-containing functional group even when the amount of the alkali metal salt is low. When the amount of the alkali metal is within the above-described range, phenomena such as the occurrence of fish eyes, streaks, etc., the lowering of tint and the like, attributed to a cross-linking reaction between EVOHs during melting by heating, can be avoided. Particularly, the thermal stability of EVOH at or above 240° C. is improved.

Methods for adjusting the content of alkali metal salt in EVOH (A) to within the above-described range are not particularly limited; since EVOH after saponification usually contains an alkali metal salt as a saponification catalyst residue, a method is preferred in which EVOH after saponification is washed to remove the alkali metal salt in accordance with a known method, and then, a prescribed amount of an alkali metal salt is added again. Methods for washing EVOH after saponification include methods in which chipped EVOH is added to a large amount of water, followed by stirring, methods in which a shower of water is sprayed, methods in which continuous washing is effected using a tower-type washing apparatus, and so on. Methods for adding the alkali metal salt in EVOH include methods in which EVOH is soaked in a solution of an alkali metal salt, methods in which EVOH is melted and blended with an alkali metal salt, methods in which EVOH is dissolved in an appropriate solvent and mixed with an alkali metal salt, and so on.

When EVOH (A) is soaked in a solution of an alkali metal salt, the concentration of the alkali metal salt in the solution is not particularly limited. Although solvents for the solution are not limited, an aqueous solution is preferred for reasons concerning handling. The weight of the solution for soaking EVOH is usually 3 times or more, and preferably 20 times or more, the weight of dried EVOH. Although a suitable range for the soaking period varies depending on the form of the EVOH, it is usually 1 hour or more, and preferably 2 hours or more, for chips of about 1 to 10 mm.

EVOH (A) may be blended with a boron compound. The boron compound herein includes boric acids, boric acid esters, boric acid-salts, boron hydrides, and the like. Specifically, the boric acids include orthoboric acid, metaboric acid, tetraboric acid, and the like; the boric acid esters include triethyl borate, trimethyl borate and the like; and the boric acid salts include alkali metal salts and alkaline earth metal salts of the above-described boric acids, borax and the like. Of these compounds, orthoboric acid is preferred.

The boron compound content in EVOH (A) is preferably 20 to 2,000 ppm, and more preferably 50 to 1,000 ppm, converted to a boron element basis. By making the boron compound content within such a range, an EVOH having a reduced torque variation on heat melting can be obtained.

A suitable melt flow rate (MFR) (at 190° C. under a load of 2,160 g) of EVOH (A) is 0.1 to 50 g/10 min., more suitably 0.3 to 40 g/10 min., and most suitably 0.5 to 30 g/10 min. However, for those having a melting point around 190° C. or beyond 190° C., the value is represented by extrapolation at 190° C. in a semi-logarithmic graph, measuring MFR at plural temperatures above the melting point under a load of 2,160 g and plotting reciprocals of the temperatures on the abscissa and logarithms of MFR on the ordinate. These EVOH resins (A) can be used independently or can be used in a mixture of two or more.

In addition, so far as the object of the invention is not adversely affected, EVOH (A) can be blended with a thermal stabilizer, an ultraviolet absorber, an antioxidant, a coloring agent, other resins (polyamides, polyolefins, etc.), and a plasticizer such as glycerol, glycerol monostearate, etc. Especially, the addition of a metal salt of a higher aliphatic carboxylic acid and/or a hydrotalcite compound or the like is effective from a viewpoint for preventing thermal deterioration of EVOH (A).

The hydrotalcite compound herein can particularly include hydrotalcite compounds in the form of a double salt represented by $M_xAl_y(OH)_{2x+3y-2z}(A)_z \cdot aH_2O$ (wherein M is Mg, Ca, or Zn; A is $CO_3$ or $HPO_4$; x, y, z, and a are each a positive number). Particularly suitable compounds are exemplified by the following hydrotalcite compounds:

$Mg_6Al_2(OH)_{16}CO_3 \cdot 4H_2O$ $Mg_8Al_2(OH)_{20}CO_3 \cdot 5H_2O$ $Mg_5Al_2(OH)_{14}CO_3 \cdot 4H_2O$ $Mg_{10}Al_2(OH)_{22}(CO_3)_2 \cdot 4H_2O$ $Mg_6Al_2(OH)_{16}HPO_4 \cdot 4H_2O$ $Ca_6Al_2(OH)_{16}CO_3 \cdot 4H_2O$ $Zn_6Al_6(OH)_{16}CO_3 \cdot 4H_2O$ $Mg_{4.5}Al_2(OH)_{13}CO_3 \cdot 3.5H_2O$ In addition, compounds including a hydrotalcite-based solid solution $[Mg_{0.75}Zn_{0.25}]_{0.67}Al_{0.33}(OH)_2 (CO_3)_{0.167} \cdot 0.45H_2O$, described in Japanese Patent Laid-Open No. 308439/1989 (U.S. Pat. No. 4,954,557), can also be used as the hydrotalcite compound.

The metal salt of higher aliphatic carboxylic acid includes metal salts of a higher aliphatic carboxylic acid having 8 to 22 carbon atoms, for example, lauric acid, stearic acid, myristic acid, and the like. The metal includes magnesium, calcium, zinc, barium, aluminum, and the like. Among them, alkaline earth metals such as magnesium, calcium, barium, and the like are suitable.

The content of the metal salt of higher aliphatic carboxylic acid or hydrotalcite compound is preferably 0.01 to 3 parts by weight, and more preferably 0.05 to 2.5 parts by weight, based on 100 parts by weight of EVOH (A).

EVOH (A) as described above is particularly excellent in regard to thermal stability and exhibits almost no thermal deterioration when retained in a molding machine; therefore, it allows continuous service for a long term.

The resin composition (B) used in the invention comprises 1 to 40% by weight of a thermoplastic resin (b1) having a boron-containing functional group and 60 to 99% by weight of polypropylene (b2). The boron-containing functional group contained in the thermoplastic resin (b1) refers to at least one functional group selected from the group consisting of boron-containing groups that are convertible to a boronic acid group in the presence of water and a boronic acid group. Of the boron-containing functional group, the boronic acid group is a group represented by the following formula (I):

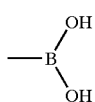 (I)

On the other hand, the boron-containing groups that are convertible to a boronic acid group in the presence of water refers to boron-containing groups that are convertible to a boronic acid group as represented by the above-described formula (I) upon hydrolysis in the presence of water. More specifically, they refer to functional groups that are convertible to a boronic acid group when hydrolyzed in a solvent of water alone, a mixture of water and an organic solvent (toluene, xylene, acetone, etc.), a mixture of a 5% aqueous boric acid solution and the organic solvent as described above, or the like under conditions at room temperature to 150° C. for 10 minutes to 2 hours. Typical examples of such functional groups include boronic acid ester groups represented by the following formula (II), boronic anhydride groups represented by the following formula (III), boronic acid salt groups represented by the following formula (IV) and the like:

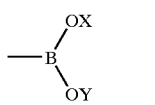 (II)

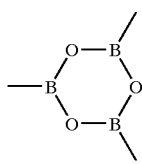 (III)

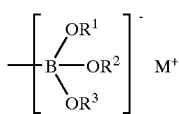 (IV)

wherein in the formulae, X and Y each represent a hydrogen atom, an aliphatic hydrocarbon group (a linear or branched alkyl group or alkenyl group having 1 to 20 carbon atoms, etc.), an alicyclic hydrocarbon group (a cycloalkyl group, a cycloakenyl group, etc.) or an aromatic hydrocarbon group (a phenyl group, a biphenyl group, etc.), and X and Y may be the same or different, provided that the case where both X and Y are a hydrogen atom is excluded. In addition, X and Y may be bound to each other. $R^1$, $R^2$ and $R^3$ each represent a hydrogen atom, an aliphatic hydrocarbon group, an alicyclic hydrocarbon group or an aromatic hydrocarbon group similar to the above-described X and Y, and $R^1$, $R^2$ and $R^3$ may be the same or different. In addition, M represents an alkali metal. Further, the above-described X, Y, $R^1$, $R^2$ and $R^3$ may be substituted with one or more other groups, for example, a hydroxyl group, a carboxyl group, a halogen atom, etc.

Specific examples of the boronic acid ester groups represented by the general formula (II) include a dimethyl boronate group, a diethyl boronate group, a dipropyl boronate group, a diisopropyl boronate group, a dibutyl boronate group, a dihexyl boronate group, a dicyclohexyl boronate group, a boronic acid ethylene glycol ester group, a boronic acid propylene glycol ester group, a boronic acid 1,3-propanediol ester group, a boronic acid 1,3-butanediol ester group, a boronic acid neopentylglycol ester group, a boronic acid catechol ester group, a boronic acid glycerol ester group, a boronic acid trimethylolethane ester group, a boronic acid trimethylolpropane ester group, a boronic acid diethanolamine ester group and the like.

In addition, the boronic acid salt groups represented by the general formula (IV) include boronic acid alkali metal salt groups and the like. Specific groups include a boronic acid sodium salt group, a boronic acid potassium salt group and the like.

Of these boron-containing functional groups, boronic acid cyclic ester groups are preferred from the viewpoint of thermal stability. The boronic acid cyclic ester groups include, for example, boronic acid cyclic ester groups containing a 5-membered ring or a 6-membered ring. Specific groups include a boronic acid ethylene glycol ester group, a boronic acid propylene glycol ester group, a boronic acid 1,3-propanediol ester group, a boronic acid 1,3-butanediol ester group, a boronic acid glycerol ester group, and the like.

The boron-containing functional group contained in the thermoplastic resin (b1) may be of only one kind or two kinds or more. The amount of the boron-containing functional group is preferably 0.0001 to 0.002 equivalent per gram of the thermoplastic resin, i.e., 100 to 2,000 µeq/g, and more preferably 150 to 1,500 µeq/g of thermoplastic resin (b1).

Specific examples of the thermoplastic resin (b1) include polyolefin resins such as (ultra low-density, low-density, medium-density, or high-density) polyethylene, an ethylene-vinyl acetate copolymer, an ethylene-acrylic acid ester copolymer, polypropylene, an ethylene-propylene copolymer, copolymers of ethylene with an α-olefin such as 1-butene, isobutene, 3-methylpentene, 1-hexene, 1-octene, etc., and so on; grafted modification products of the above-described polyolefins with maleic anhydride, glycidyl methacrylate or the like; styrene resins such as polystyrene, a styrene-acrylonitrile copolymer, etc.; styrene-hydrogenated diene block copolymer resins such as a styrene-hydrogenated butadiene block copolymer, a styrene-hydrogenated isoprene block copolymer, a styrene-hydrogenated butadiene-styrene block copolymer, a styrene-hydrogenated isoprene-styrene block copolymer, etc.; (meth)acrylic acid ester resins such as polymethyl acrylate, polyethyl acrylate, polymethyl methacrylate, etc.; halogenated vinyl resins such as polyvinyl chloride, vinylidene fluoride, etc.; semi-aromatic polyester resins such as polyethylene terephthalate, polybutylene terephthalate and the like; aliphatic polyester resins such as polyvalerolactone, polycaprolactone, polyethylene succinate, polybutylene succinate, etc., and so on. Only one of them may be used, or a mixture of two or more may also be used. Among them, polyolefin resins and styrene-hydrogenated diene block copolymer resins are preferred.

When the thermoplastic resin (b1) is a styrene-hydrogenated diene block copolymer resin, the weight ratio of styrene units to hydrogenated diene units contained in the copolymer resin is preferably 5/95 to 70/30, and more preferably 10/90 to 50/50.

Next, typical processes for producing the thermoplastic resin (b1) having a boron-containing functional group used in the invention are described.

First Process

The thermoplastic resin (b1) having a boron-containing functional group may be obtained by reacting a thermoplastic resin having an olefinic double bond with a borane complex and a trialkyl borate in a nitrogen atmosphere to give a thermoplastic resin having a boronic acid dialkyl ester group, followed by reacting the product with water or an alcohol, if necessary. In this manner, a boron-containing functional group is introduced into the olefinic double bond in the thermoplastic resin by the addition reaction.

The olefinic double bond is introduced into a terminal, for example, by the disproportionation when radical polymerization is terminated, or introduced into a backbone chain or a side chain by a side reaction during the polymerization. Particularly, the above-described polyolefin resins are preferred because an olefinic double bond can be easily introduced by thermal decomposition under an oxygen-free condition or copolymerization of a diene compound, and the styrene-hydrogenated diene block copolymer resins are preferred because the olefinic double bond can be maintained in an appropriate degree by controlling the hydrogenation reaction.

The content of the double bonds in the thermoplastic resin used as the raw material is preferably 100 to 2,000 $\mu$eq/g and more preferably 200 to 1,000 $\mu$eq/g. By using such a raw material, the control of the amount of the boron-containing functional group to be introduced becomes easy. In addition, control of the amount of double bonds remaining after the introduction also becomes possible.

As the borane complex, preferred are a borane-tetrahydrofuran complex, a borane-dimethyl sulfide complex, a borane-pyridine complex, a borane-trimethylamine complex, a borane-triethylamine complex and the like. Among them, more preferred are a borane-dimethyl sulfide complex, a borane-trimethylamine complex and a borane-triethylamine complex. The amount of the borane complex charged is preferably within a range of ⅓ equivalent to 10 equivalents based on the amount of olefinic double bonds in the thermoplastic resin.

As the trialkyl borate, preferred are lower alkyl borates such as trimethyl borate, triethyl borate, tripropyl borate, tributyl borate, etc. The amount of the trialkyl borate charged is preferably within a range of 1 to 100 equivalents based on the amount of olefinic double bonds in the thermoplastic resin. Although no solvent need be particularly used; when it is used, saturated hydrocarbon solvents such as hexane, heptane, octane, decane, dodecane, cyclohexane, ethylcyclohexane, decalin, etc. are preferred. The reaction temperature is usually within the range of room temperature to 300° C., and preferably 100 to 250° C.; within this temperature range, the reaction is preferably carried out for 1 minute to 10 hours, and preferably 5 minutes to 5 hours.

The boronic acid dialkyl ester group introduced into the thermoplastic resin by the above-described reaction can be hydrolyzed to a boronic acid group according to a known process. In addition, it can be converted to any boronic acid ester group by an ester exchange reaction with an alcohol, again, according to a known process. Moreover, it can be converted to a boronic anhydride group by subjecting it to dehydration-condensation with heating. Still further, it can be converted to a boronic acid salt group by reaction with a metal hydroxide or a metal alcoholate according to a known process.

Such conversion of the boron-containing functional group is usually carried out with an organic solvent such as toluene, xylene, acetone, ethyl acetate, etc. The alcohol includes monohydric alcohols such as methanol, ethanol, butanol, etc.; polyhydric alcohols such as ethylene glycol, propylene glycol, 1,3-propanediol, 1,3-butanediol, neopentyl glycol, glycerol, trimethylolmethane, pentaerythritol, dipentaerythritol, etc.; and so on. In addition, the metal hydroxide includes hydroxides of an alkali metal such as sodium, potassium, etc. Moreover, the metal alcoholate includes those composed of the above-described metal and the above-described alcohol. These are not limited to the exemplified compounds. The amount of them is usually 1 to 100 equivalents based on the boronic acid dialkyl ester group.

Second Process

The thermoplastic resin (b1) having a boron-containing functional group may be obtained by amidating a known carboxyl group-containing thermoplastic resin with an amino group-containing boronic acid or amino group-containing boronic acid ester such as m-aminophenylbenzeneboronic acid, m-aminophenylboronic acid ethylene glycol ester, etc. according to a known process. In this reaction, a condensing agent such as a carbodiimide may be used. The boron-containing functional group introduced into the thermoplastic resin in this manner can be converted to another boron-containing functional group according to the method described above.

The carboxyl group-containing thermoplastic resin includes, but is not limited to, resins having a carboxyl group at a terminal of a semi-aromatic polyester resin or an aliphatic polyester resin; resins formed by introducing a carboxyl group-containing monomer unit such as acrylic acid, methacrylic acid, maleic anhydride, etc. into a polyolefin resin, a styrene resin, a (meth)acrylate resin, a halogenated vinyl resin, etc. by copolymerization; resins formed by introducing a maleic anhydride, etc. into a thermoplastic resin having an olefinic double bond as described above by addition reaction; and others.

As the polypropylene (b2) constituting the resin composition (B), random or block copolymers with other olefin compounds such as ethylene or the like, in addition to homopolypropylene, can be used. Among them, copolymers with ethylene are preferred from the viewpoints of transparency and the outer appearance of molded products. In addition, the melt index of the polypropylene (b2) is preferably 0.1 to 100 g/10 min. (at 230° C. under a load of 2,160 g), more preferably 0.2 to 50 g/10 min., and most preferably 0.5 to 20 g/10 min.

In the resin composition (B), it is necessary that the amount of the thermoplastic resin (b1) having a boron-containing functional group added is 1 to 40% by weight, preferably 5 to 35% by weight, and more preferably 10 to 30% by weight, based on the total weight of resin composition (B). When the amount is less than 1% by weight, there is a possibility that the effect for improving the interlayer adhesion between the EVOH (A) layer and the resin composition (B) layer is insufficient, and as the result, the interlayer adhesion strength of the obtained container may be reduced. When the amount exceeds 40% by weight, there is a possibility that the cost for producing containers will be increased.

In addition, in the resin composition (B), the amount of polypropylene (b2) added is 60 to 99% by weight, preferably 65 to 95% by weight, and more preferably 70 to 90% by weight, based on the total weight of resin composition (B).

The resin composition (B) can easily be obtained by melt-kneading the thermoplastic resin (b1) having a boron-containing functional group and the polypropylene (b2) using a usual melt-kneading apparatus such as a single-screw or twin-screw extruder, etc. The melt-kneading apparatus is not particularly limited, and it is preferred to use an extruder having a high kneading degree in order to attain uniform blending. In addition, it is preferred to seal a hopper inlet with nitrogen gas and carry out the extrusion at a low temperature in order to prevent the occurrence or mingling of gels or hard spots. In this operation, so far as the object of the invention is not adversely affected, an antioxidant, a plasticizer, a thermal stabilizer, an ultraviolet absorber, an antistatic agent, a lubricant, a coloring agent, a filler, and other resins may be added.

Because the adhesion between polypropylene and EVOH is low, when polypropylene and EVOH are laminated without using an adhesive layer for cost-reduction purposes, pealing-off may occur during usage; by using the above-described resin composition (B) in place of polypropylene, the pealing-off problem during usage is avoided.

The multilayer blow molded container of the invention has a layer of EVOH (A) and a layer of the resin composition (B) as the essential components. So far as the object of the invention is not adversely affected, the layer of the resin composition (B) may be composed of plural layers and may have a layer of a resin composition comprising a blend of the resin composition (B) and EVOH (A) (such as a recovery layer); but it is preferable that the layer constitution comprises exclusively layers of EVOH (A) and layers of the resin composition (B), and it is more preferable that the layer constitution comprises a layer of the resin composition (B) on both sides of a layer of EVOH (A). Specifically, when the layer of EVOH (A) is designated as A, and the layer of the composition (B) is designated as B, examples of suitable layer constitutions (structures) include (outer)B/A/B(inner), (outer)B/A/B/A/B(inner), and the like. In the above description, (inner) indicates the inner layer, i.e., a layer that will come into contact with the contents.

As a method for producing the multilayer blow molded container, well-known methods such as direct blow molding, extrusion stretch blow molding, injection blow molding etc. may be used.

In the direct blow molding method, at first, a tubular multilayer parison is produced by a process in which the resin composition (B) for inner and outer layers, EVOH (A), and if necessary, adhesive resin are charged separately into each extruder of a multilayer extruder with at least two extruders, blended separately, and extruded in melt so as to meet each layer together in the molding die for multilayer parison or out of the die just after being taken out. Then, the parison in melt is molded with blow molding to obtain a multilayer container.

In the extrusion stretch blow molding method, a multilayer pipe is produced by extrusion molding, cut off to an appropriate length; one end of the pipe is sealed and the other end is processed so as to have a lid such as a cap installed, and then, the pipe is re-heated and blow molded to obtain a multilayer container.

As compared these two molding methods, in the direct blow molding method, in general, since molecular orientation of the resin is low, the mechanical properties are not so high. On the other hand, the dimensional stability at high temperature is good, so it is preferable when high temperature sterilization is required. In the meantime, extrusion stretch blow molding is preferable for containers in which pressure resistance and anti-creep properties are required, such as for carbonated beverages.

Injection blow molding is also preferable for the method of producing the multilayer blow molded container of the invention. In injection blow molding, a precursor of the container (multilayer parison) obtained by multilayer injection molding is molded by stretch blow molding. In the multilayer injection molding, the molding is performed by injecting resins for constituting the respective layers from respective injection cylinders into concentric nozzles simultaneously or alternately in staggered times.

In the present invention, the multilayer parison is produced, for example, (1) by a process in which layers of the resin composition (B) for inner and outer layers are first injected, and then, EVOH (A) for the intermediate layer is injected to give a molded container having a three-layer constitution of B/A/B; (2) by a process in which layers of the resin composition (B) for inner and outer layers are first injected, then EVOH (A) is injected, and simultaneously or thereafter, layers of the resin composition (B) are injected again to give a molded container having a five-layer constitution of B/A/B/A/B; and so on; the process is not limited thereto. It is preferred that the process includes a step of carrying out a single mold closing operation on a single mold using a molding machine having two or more injection cylinders.

As to the conditions for injection molding, the resin composition (B) may be injection molded at a temperature preferably within a range of 180 to 250° C., and more preferably 200 to 250° C., from the viewpoint of fluidity of the resin composition (B) on melting as well as outer appearance and strength of the obtained container. In addition, the EVOH (A) is injection molded at a temperature preferably within a range of 170 to 280° C., more preferably 180 to 260° C., and most preferably 190 to 240° C., from the viewpoint of fluidity and thermal stability of EVOH (A) on melting as well as outer appearance and gas-barrier properties of the obtained container. Furthermore, the temperature of the mold is preferably within a range of 0 to 70° C., more preferably 5 to 50° C., and most preferably 10 to 30° C., from the viewpoint of prevention of crystallization in each layer component, molding performance on molding, and outer appearance of the obtained container.

The multilayer parison obtained in this manner preferably has a total thickness of 2 to 5 mm, and a summed-up thickness of EVOH layers of 10 to 500 $\mu$m. The obtained multilayer parison is transferred to a stretch blow step directly at a high temperature or after re-heating with a heating element such as a block heater, an infrared heater, etc. The heated multilayer parison is stretched 1 to 5 times in the machine direction in the stretch blow step and then stretch blow molded 1 to 4 times by compressed air or the like, whereby the multilayer injection blow molded container of the invention can be produced. In the production, the temperature of the multilayer parison is preferably 130 to 180° C., and more preferably 135 to 170° C., from the viewpoint of molding properties.

The total thickness of the container body of the multilayer blow molded container obtained in the above manner is generally 0.1 to 3 mm, and varies depending on the use. In addition, the summed-up thickness of EVOH layers is preferably within a range of 2 to 200 $\mu$m, and more preferably 5 to 100 $\mu$m.

As described above, since the multilayer blow molded container of the invention has a multilayer constitution comprising the layer of EVOH (A) and the layer of the resin composition (B), it has all of the mechanical strength of the layer of the resin composition (B) such as the interlayer adhesion strength toward the layer of EVOH (A), as well as the gas-barrier properties, the scent-retaining property, the organic solvent resistance, and the like, which the layer of EVOH (A) possesses. This container is suitable for storing various contents for a long time, and is useful as a container for storing various drinks including customarily hot-filled red tea, foods, cosmetics, blood samples, and the like. Specific examples of the container include, but are not limited to, bottles, cups, tubes, trays, and the like. Among them, bottles are particularly suitable.

EXAMPLES

The invention will now be described in more detail with reference to the following Examples, but these Examples should not be construed as a limiting the invention.

Synthesis Example 1

Synthesis of SEBS Having a Boronic Acid Ester Group

Into a twin-screw extruder was fed a styrene-hydrogenated butadiene-styrene block copolymer (SEBS, styrene/hydrogenated butadiene=18/82 (weight ratio,), degree of hydrogenation of butadiene unit: 97%, amount of double bonds: 430 μeq/g, melt index: 5 g/10 min. (230° C., load: 2,160 g) ) at a rate of 7 kg/hour while injecting nitrogen through an inlet at a rate of 1 liter/min. Then, a mixed solution of a borane-triethylamine complex (TEAB) and boric acid 1,3-butanediol ester (BBD) was fed (TEAB/BBD=29/71 in weight ratio) from a liquid feeder 1 at a rate of 0.6 kg/hour, and 1,3-butanediol was fed from a liquid feeder 2 at a rate of 0.4 kg/hour; they were continuously kneaded. During kneading, the pressure was controlled such that the gauge pressures at a vent 1 and a vent 2 indicated about 20 mmHg. As the result, SEBS (X-1) having boronic acid 1,3-butanediol ester groups (BBDE) was obtained from an outlet at a rate of 7 kg/hour. This SEBS contained the boronic acid 1,3-butanediol ester groups in an amount of 210 μeq/g, double bonds in an amount of 150 μeq/g, and had a melt index of 5 g/10 min. (230° C., load: 2,160 g).

The constitution and operating conditions of the twin-screw extruder used for the reaction were as follows:

Parallel twin-screw extruder TEM-35B (manufactured by Toshiba Machine Co., Ltd.)

Screw diameter: 37 mmφ

L/D: 52 (15 blocks)

Liquid feeders: C3 (liquid feeder 1) and C11 (liquid feeder 2)

Vent positions: C6 (vent 1) and C14 (vent 2)

Constitution of screws: seal rings at positions between C5 and C6, between C10 and C11, and at C12

Temperature Settings:

| | |
|---|---|
| C1 | water cooling |
| C2 to C3 | 200° C. |
| C4 to C15 | 250° C. |
| Die | 250° C. |

Revolution rate of screw: 400 rpm

Synthesis Example 2

Synthesis of EPDM Having a Boronic Acid Ester Group

Into a twin-screw extruder was fed an ethylene-propylene-ethylidenenorbornene copolymer (EPDM, amount of double bonds: 390 μeq/g, melt index: 4 g/10 min. (190° C., load: 2,160 g)) at a rate of 7 kg/hour while injecting nitrogen through an inlet at a rate of 1 liter/min. Then, a mixed solution of a borane-triethylamine complex (TEAB) and boric acid 1,3-butanediol ester (BBD) was fed (TEAB/BBD=29/71 in weight ratio) from a liquid feeder 1 at a rate of 0.8 kg/hour, and propylene glycol was fed from a liquid feeder 2 at a rate of 0.4 kg/hour; they were continuously kneaded. During kneading, the pressure was controlled such that the gauge pressures at a vent 1 and a vent 2 indicated about 20 mmHg. As the result, EPDM (X-2) having boronic acid 1,3-butanediol ester groups (BBDE) and boronic acid propylene glycol ester groups (BPGE ) was obtained from an outlet at a rate of 7 kg/hour. This EPDM contained the boronic acid 1,3-butanediol ester group in an amount of 180 μeq/g, the boronic acid propylene glycol ester group in an amount of 150 μeq/g, no double bonds, and had a melt index of 4 g/10 min. (190° C., load: 2,160 g).

Synthesis Example 3

Synthesis of SEPS Having a Boronic Acid Ester Group

Into a twin-screw extruder was fed a styrene-hydrogenated isoprene-styrene block copolymer (SEPS, styrene /hydrogenated isoprene=16/84 (weight ratio), degree of hydrogenation of isoprene unit: 92%, amount of double bond: 930 μeq/g, melt index: 2 g/10 min. (230° C., load: 2,160 g)) at a rate of 6 kg/hour while injecting nitrogen through an inlet at a rate of 1 liter/min. Then, a mixed solution of a borane-triethylamine complex (TEAB) and boric acid 1,3-butanediol ester (BBD) was fed (TEAB/BBD=29/71 in weight ratio) from a liquid feeder 1 at a rate of 1.2 kg/hour, and 1,3-butanediol was fed from a liquid feeder 2 at a rate of 0.6 kg/hour; they were continuously kneaded. During kneading, the pressure was controlled such that the gauge pressures at a vent 1 and a vent 2 indicated about 20 mmHg. As the result, SEPS (X-3) having boronic acid 1,3-butanediol ester groups (BBDE) was obtained from an outlet at a rate of 6 kg/hour. This SEPS contained the boronic acid 1,3-butanediol ester group in an amount of 520 μeq/g, double bonds in an amount of 380 μeq/g, and had a melt index of 2 g/10 min. (230° C., load: 2,160 g).

Example 1

Into a twin-screw type vent extruder were charged 80 parts by weight of polypropylene (B-1, melt index: 8.8 g/10 min. (230° C., load: 2,160 g) ) and 20 parts by weight of SEBS (X-1) obtained in Synthesis Example 1; they were extruded for pelletization at 220° C. in the presence of nitrogen to give pellets of a resin composition.

A two-kind/three-layer parison of the type: resin composition/EVOH/resin composition was molded from the obtained pellets of resin composition and EVOH (A-1) having the constitution and physical properties shown in Table 1 as raw materials using a co-injection molding machine manufactured by Kortec/Husky (model: SL 160, 4-pieces type). In this production, the temperature in the injection machine at the resin composition side was 220° C., the temperature in the injection machine at the EVOH side was 200° C., the temperature in a hot runner block part at which the resin composition and EVOH were combined was 220° C., the core temperature of the injection mold was 10° C., and the cavity temperature of the injection mold was 10° C.

Thereafter, stretch blow molding was carried out by heating the parison to 170° C. at a surface temperature using a stretch blow molding machine manufactured by Crupp Corpoplast Machinenbau, to give two-kind/three-layer type multilayer injection blow molded bottles having a thickness for the resin composition of the inner layer of 120 μm, that for EVOH of the intermediate layer of 20 μm and that for the resin composition of the outer layer of 150 μm, in average thickness of the body.

The method for quantitatively analyzing the alkali metal salts contained in the EVOH used and the methods for evaluating the obtained multilayer injection blow molded bottles are described below:

(1) Quantitative Analysis of Alkali Metal Salts in EVOH:

Into 50 ml of a 0.01 N aqueous hydrochloric acid solution were added 10 g of dried chips as a sample, and the mixture was stirred at 95° C. for 6 hours. The aqueous solution after stirring was quantitatively analyzed by ion chromatography to quantify the amount of alkali metal ions. The column used was a ICS-C25 column manufactured by Yokogawa Electric Corporation, and the eluent was an aqueous solution containing 5.0 mM tartaric acid and 1.0 mM 2,6-pyridinedicarboxylic acid. In the quantification, a calibration curve prepared with each alkali metal chloride was used as a standard. From the amounts of the alkali metal ions obtained in this manner, the amounts of alkali metal salts in the dried chips were calculated as amounts converted to metal elements.

(2) Generation Rate of Delamination in Multilayer Container:

Water was filled in the bottle as the content; after tightly stoppering under atmospheric pressure, the bottle was subjected to gravity-drop only once onto a 20 cm-triangular receiver having an angle of 90° from a height of 50 cm under the condition that the bottle body was kept horizontal so that the corner of the receiver struck the center of the bottle body. A hundred bottles were tested for one kind of bottle, and the generation rate of delamination, Rd (%) was calculated from the number Nd of bottles exhibiting delamination according to the following equation:

$$Rd=(Nd/100) \times 100$$

(3) Evaluation of Outer Appearance of Parison:

In order to evaluate the thermal stability of the resin as the raw material, the production of bottles was carried out continuously for 7 days, and the obtained parisons were observed for any existence of hard spots, gels, streaks, etc.

Example 2

The pelletization was carried out in the same manner as in Example 1, except that the EPDM (X-2) obtained in Synthesis Example 2 was used in place of the SEBS (X-1) used in Example 1, to give pellets of a resin composition.

From the obtained pellets of the resin composition and the EVOH (A-1) used in Example 1 as raw materials, two-kind/three-layer type multilayer injection blow molded bottles were produced and evaluated in the same manner as in Example 1.

Example 3

Into a twin-screw type vent extruder were charged 80 parts by weight of polypropylene (B-2, melt index: 0.9 g/10 min. (230° C., load: 2,160 g)) and 20 parts by weight of the SEBS (X-3) obtained in Synthesis Example 3; they were extruded for pelletization at 220° C. in the presence of nitrogen to give pellets of a resin composition.

From the obtained pellets of the resin composition and the EVOH (A-1) as raw materials, two-kind/three-layer type multilayer injection blow molded bottles were produced and evaluated in the same manner as in Example 1.

Example 4

Two-kind/three-layer type multilayer injection blow molded bottles were produced and evaluated in the same manner as in Example 1, except that EVOH (A-2) having the constitution and physical properties shown in Table 1 was used in place of the EVOH (A-1) used in Example 1.

Example 5

A two-kind/three-layer multilayer direct blow molded bottle of the type: resin composition/EVOH/resin composition was molded from the resin composition obtained in Example 1 (polypropylene (B-1)/SEBS (X-1)=80/20, weight ratio) and EVOH (A-1) as raw materials using a four-kind/seven-layer hollow molding machine manufactured by Suzuki Tekko-sho (TB-ST-6P). In this production, the temperature in the extrusion machine at the resin composition side was 210° C., the temperature in the extrusion machine at the EVOH side was 210° C., the resin temperature in a die was 220° C., and the temperature of the direct blow mold was 40° C.

The average thickness of the body of the obtained direct blow molded bottle is 230 μm for the resin composition at the inner layer, 25 μm for the EVOH at the intermediate layer and 230 μm for the resin composition at the outer layer. The generation rate of delamination of this bottle was evaluated in the same manner as in Example 1. Furthermore, the outer appearance of this bottle was evaluated in the manner described below.

(4) Evaluation of Outer Appearance of Bottle:

In order to evaluate the thermal stability of the resin as the raw material, the production of bottles was carried out continuously for 7 days, and the obtained bottles were observed for any existence of hard spots, gels, streaks, etc.

Comparative Example 1

Two-kind/three-layer type multilayer injection blow molded bottles were produced and evaluated in the same manner as in Example 1, except that polypropylene (B-1) was used in place of the pellets of the resin composition used in Example 1.

Comparative Example 2

The pelletization was carried out in the same manner as in Example 1, except that a maleic anhydride (MAn)-modified polypropylene (Y-1, "Admer QF 551" manufactured by Mitsui Chemical, melt index: 5.7 g/10 min. (230° C., load: 2,160 g)) was used in place of the SEBS (X-1) used in Example 1, to give pellets of a resin composition.

From the obtained pellets of the resin composition and the EVOH (A-1) used in Example 1 as raw materials, two-kind/three-layer type multilayer injection blow molded bottles were produced and evaluated in the same manner as in Example 1.

Comparative Example 3

Two-kind/three-layer type multilayer injection blow molded bottles were produced and evaluated in the same manner as in Comparative Example 2, except that EVOH (A-2) was used in place of the EVOH (A-1) used in Comparative Example 2.

The EVOH and resin components used in the resin compositions for the multilayer blow molded containers in the Examples of the invention and the Comparative Examples are shown in the following Table 1, Table 2, and Table 3.

TABLE 1

Composition and physical properties of EVOH

| EVOH | Ethylene content, mol % | Degree of saponification, % | Alkali metal salt content[*1], ppm | Melt index[*2], g/10 min. |
|---|---|---|---|---|
| A-1 | 32 | 99.5 | 20 | 1.6 |
| A-2 | 32 | 99.5 | 300 | 1.6 |

[*1] a value converted to an alkali metal element
[*2] a value at 190° C. under a load of 2,160 g

TABLE 2

Physical properties of polypropylene (PP)

| PP | Melt index[*3], g/10 min. |
|---|---|
| B-1 | 8.8 |
| B-2 | 0.9 |

[*3] a value at 230° C. under a load of 2,160 g

TABLE 3

Composition and physical properties of modified resin (b1)

| b1 | Base polymer | Functional group | Melt index, g/10 min. |
|---|---|---|---|
| X-1 | SEBS | BBDE | 5[*4] |
| X-2 | EPDM | BBDE, BPGE | 4[*5] |
| X-3 | SEPS | BBDE | 2[*4] |
| Y-1 | PP | MAn | 5.7[*4] |

[*4] a value at 230° C. under a load of 2,160 g
[*5] a value at 190° C. under a load of 2,160 g The layer constitutions (structures) and the results of the evaluations of the bottles are summarized in Table 4.

TABLE 4

Layer constitution and results of evaluation

| | Layer A EVOH | Layer B Modified resin (b1) | Layer B PP (b2) | Layer B Weight ratio (b1/b2) | Layer constitution | Molding method[*6] | Generation rate of delamination | Outer appearance of parison[*7] |
|---|---|---|---|---|---|---|---|---|
| Example 1 | A-1 | X-1 | B-1 | 20/80 | B/A/B | injection | 0 | A |
| Example 2 | A-1 | X-2 | B-1 | 20/80 | B/A/B | injection | 0 | A |
| Example 3 | A-1 | X-3 | B-2 | 20/80 | B/A/B | injection | 0 | A |
| Example 4 | A-2 | X-1 | B-1 | 20/80 | B/A/B | injection | 0 | B |
| Example 5 | A-1 | X-1 | B-1 | 20/80 | B/A/B | direct | 0 | A[*8] |
| Comparative Example 1 | A-1 | — | B-1 | — | B/A/B | injection | 90 | A |
| Comparative Example 2 | A-1 | Y-1 | B-1 | 20/80 | B/A/B/ | injection | 20 | A |
| Comparative Example 3 | A-2 | Y-1 | B-1 | 20/80 | B/A/B | injection | 20 | B |

[*6] "injection": Injection blow molding
"direct": Direct blow molding
[*7] A: Hard spots and streaks were not generated.
B: Streaks were generated.
[*8] Outer appearance of direct blow molded bottle was evaluated

Effect of the Invention:

As described above, the multilayer blow molded container of the invention has all of the mechanical strength of the layer of the resin composition (B) such as the interlayer adhesion strength toward the layer of EVOH (A), as well as the gas-barrier properties, the scent-retaining property, the organic solvent resistance and the like, which the layer of EVOH (A) possesses. This container is suitable for storing various contents for a long time, and is useful as a container for storing various drinks including customarily hot-filled red tea, foods, cosmetics, blood samples, and the like.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

What is claimed is:

1. A multilayer blow molded container comprising a layer of an ethylene-vinyl alcohol copolymer (A) having an ethylene content of 5 to 60% by mol and a degree of saponification of 85% or more and a layer of a resin composition (B), wherein said resin composition (B) comprises 1 to 40% by weight of a thermoplastic resin (b1) having at least one functional group selected from the group consisting of boron-containing groups that are convertible to a boronic acid group in the presence of water and a boronic acid group, and 60 to 99% by weight of polypropylene (b2).

2. The multilayer blow molded container according to claim 1, wherein the ethylene-vinyl alcohol copolymer (A) has an ethylene content of 25 to 50% by mol and a degree of saponification of 99% or more.

3. The multilayer blow molded container according to claim 1, wherein the ethylene-vinyl alcohol copolymer (A) has an alkali metal salt content, converted to an alkali metal element basis, of 100 ppm or less.

4. The multilayer blow molded container according to claim 1, wherein the ethylene-vinyl alcohol copolymer (A) has an ethylene content of 25 to 50% by mol, a degree of saponification of 99% or more and an alkali metal salt content, converted to an alkali metal element, of 100 ppm or less.

5. The multilayer blow molded container according to claim 1, wherein the thermoplastic resin (b1) is at least one resin selected from the group consisting of polyolefin resins and styrene-hydrogenated diene block copolymer resins.

6. The multilayer blow molded container according to claim 1, wherein said at least one functional group selected from the group consisting of boron-containing groups that are convertible to a boronic acid group in the presence of water and a boronic acid group is a boronic acid cyclic ester group.

7. The multilayer blow molded container according to claim 1, wherein the thermoplastic resin (b1) having at least one functional group selected from the group consisting of boron-containing groups that are convertible to a boronic acid group in the presence of water and a boronic acid group is at least one resin selected from the group consisting of polyolefin resins and styrene-hydrogenated diene block copolymer resins having a boronic acid cyclic ester group.

8. The multilayer blow molded container according to claim 1, comprising exclusively layers of the ethylene-vinyl alcohol copolymer (A) and layers of the resin composition (B).

9. The multilayer blow molded container according to claim 1, having layers of the resin composition (B) on both sides of a layer of the ethylene-vinyl alcohol copolymer (A).

10. The multilayer blow molded container according to claim 1, comprising exclusively a layer of the ethylene-vinyl alcohol copolymer (A) and layers of the resin composition (B), and having layers of (B) on both sides of the layer of (A).

11. The multilayer blow molded container according to claim 1, which is a bottle.

12. A multilayer blow molded container comprising a layer of an ethylene-vinyl alcohol copolymer (A) having an ethylene content of 25 to 50% by mol, a degree of saponification of 99% or more and an alkali metal salt content, converted to an alkali metal element, of 100 ppm or less and a layer of a resin composition (B), wherein said resin composition (B) comprises 1 to 40% by weight of at least one resin (b1) selected from the group consisting of polyolefin resins and styrene-hydrogenated diene block copolymer resins having a boronic acid cyclic ester group, and 60 to 99% by weight of polypropylene (b2).

13. The multilayer blow molded container according to claim 12, comprising exclusively layers of the ethylene-vinyl alcohol copolymer (A) and layers of the resin composition (B).

14. The multilayer blow molded container according to claim 12, having layers of the resin composition (B) on both sides of a layer of the ethylene-vinyl alcohol copolymer (A).

15. The multilayer blow molded container according to claim 12, comprising exclusively a layer of the ethylene-vinyl alcohol copolymer (A) and layers of the resin composition (B), and having layers of (B) on both sides of a layer of (A).

16. The multilayer blow molded container according to claim 12, which is a bottle.

17. A process for producing a multilayer direct blow molded container, comprising multilayer direct blow molding an ethylene-vinyl alcohol copolymer (A) having an ethylene content of 5 to 60% by mol and a degree of saponification of 85% or more and a resin composition (B) comprising 1 to 40% by weight of a thermoplastic resin (b1) having at least one functional group selected from the group consisting of boron-containing groups that are convertible to a boronic acid group in the presence of water and a boronic acid group and 60 to 99% by weight of polypropylene (b2).

* * * * *